(12) United States Patent
Kennedy et al.

(10) Patent No.: US 11,105,249 B2
(45) Date of Patent: Aug. 31, 2021

(54) EXHAUST ASSEMBLY TEMPERATURE REGULATION

(71) Applicant: Caterpillar Inc., Peoria, IL (US)

(72) Inventors: Joseph L. Kennedy, Zionsville, IN (US); Bradley W. Hodges, Dunlap, IL (US); Andrew D. Palmer, Lafayette, IN (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 16/556,520

(22) Filed: Aug. 30, 2019

(65) Prior Publication Data
US 2021/0062705 A1  Mar. 4, 2021

(51) Int. Cl.
| | | |
|---|---|---|
| *F01N 3/00* | (2006.01) | |
| *F01N 13/08* | (2010.01) | |
| *F28D 7/16* | (2006.01) | |
| *F01N 3/04* | (2006.01) | |
| *F01N 13/10* | (2010.01) | |

(52) U.S. Cl.
CPC .............. *F01N 13/082* (2013.01); *F01N 3/04* (2013.01); *F01N 13/102* (2013.01); *F28D 7/1669* (2013.01)

(58) Field of Classification Search
CPC ........ F01N 3/043; F01N 3/046; F01N 13/102; F01N 13/14; F01N 3/04; F28D 21/0003; F28D 7/10; F28D 7/103; F28D 7/106
See application file for complete search history.

(56) References Cited

U.S. PATENT DOCUMENTS

| | | | | |
|---|---|---|---|---|
| 4,977,741 | A * | 12/1990 | Lulloff | F01N 3/046 60/310 |
| 5,337,559 | A * | 8/1994 | Deutschmann | F01N 13/102 60/321 |
| 8,083,025 | B2 | 12/2011 | Murakami et al. | |
| 8,615,991 | B2 | 12/2013 | Ruckwied et al. | |
| 2011/0252775 | A1* | 10/2011 | Joergl | F01N 13/102 60/321 |
| 2015/0218986 | A1* | 8/2015 | Conyers | F01N 13/16 60/321 |
| 2016/0177815 | A1* | 6/2016 | McHenry | F01N 13/10 60/605.2 |

FOREIGN PATENT DOCUMENTS

DE          19644707 A1 *  4/1998   ........... F01N 13/102

* cited by examiner

*Primary Examiner* — Eric S Ruppert
(74) *Attorney, Agent, or Firm* — Schwegman, Lundberg & Woessner

(57) ABSTRACT

An exhaust assembly includes an exhaust tube and a coolant passage. The exhaust tube is oriented about an axis and an exhaust gas is configured to flow through the exhaust tube in a direction away from an end of the exhaust tube. The coolant passage is oriented about the axis radially outward of the exhaust tube, the coolant passage having an inner shell and an outer shell. The end of the exhaust tube includes one or more holes permitting exhaust gas to flow around the end of the exhaust tube between an outer wall of the exhaust tube and the inner shell of the coolant passage to regulate a temperature of the inner shell of the coolant passage.

20 Claims, 5 Drawing Sheets

EXHAUST ASSEMBLY TEMPERATURE REGULATION

TECHNICAL FIELD

The present application relates generally to gas engines. More particularly, the present application relates to temperature regulation for exhaust assemblies of gas engines to prevent exhaust condensation.

BACKGROUND

Landfill gas is produced naturally as organic waste decomposes in landfills. Gas engines may be configured to convert the landfill gas or other gaseous fuel into electrical energy. In some locations, the landfill gas or other gaseous fuel may include a high sulfur ($H_2S$) content. $H_2S$ can convert to Sulphur Oxides ($SO_2$ and $SO_3$) during combustion, and $SO_3$ added to $H_2O$ condenses into sulfuric acid at approximately 120-130° C. Sulfuric acid can lead to corrosion if formed on surfaces of the gas engine.

U.S. Pat. No. 8,615,991 B2 describes an example system for reducing corrosive constituents in exhaust gas. The example system includes recirculating the exhaust gas to the engine through a recirculation path that includes a corrosive constituent neutralization unit.

SUMMARY OF THE INVENTION

In one example, an exhaust assembly includes an exhaust tube and a coolant passage. The exhaust tube is oriented about an axis and an exhaust gas is configured to flow through the exhaust tube in a direction away from an end of the exhaust tube. The coolant passage is oriented about the axis radially outward of the exhaust tube, the coolant passage having an inner shell and an outer shell. The end of the exhaust tube includes one or more holes permitting exhaust gas to flow around the end of the exhaust tube between an outer wall of the exhaust tube and the inner shell of the coolant passage to regulate a temperature of the inner shell of the coolant passage.

In another example, a gas engine includes an exhaust assembly configured to carry an exhaust gas. The exhaust assembly includes an exhaust tube and a coolant passage. The exhaust tube is oriented about an axis and the exhaust gas is configured to flow through the exhaust tube in a direction away from an end of the exhaust tube. The coolant passage is oriented about the axis radially outward of the exhaust tube, the coolant passage having an inner shell. The end of the exhaust tube comprises one or more holes permitting exhaust gas to flow around the end of the exhaust tube between the exhaust tube and the inner shell of the coolant passage to regulate a temperature of the inner shell of the coolant passage.

In another example, a method of preventing condensation of exhaust gases within an exhaust assembly includes receiving the exhaust gases in an exhaust tube oriented about an axis, the exhaust gases configured to flow through the exhaust tube in a direction away from an end of the exhaust tube; receiving a coolant in a coolant passage oriented about the axis radially outward of the exhaust tube, the coolant passage having an inner shell; and directing a portion of the exhaust gases, using one or more holes in the end of the exhaust tube, to flow around the end of the exhaust tube between an outer wall of the exhaust tube and the inner shell of the coolant passage to regulate a temperature of the inner shell of the coolant passage.

DETAILED DESCRIPTION

Figure 1:
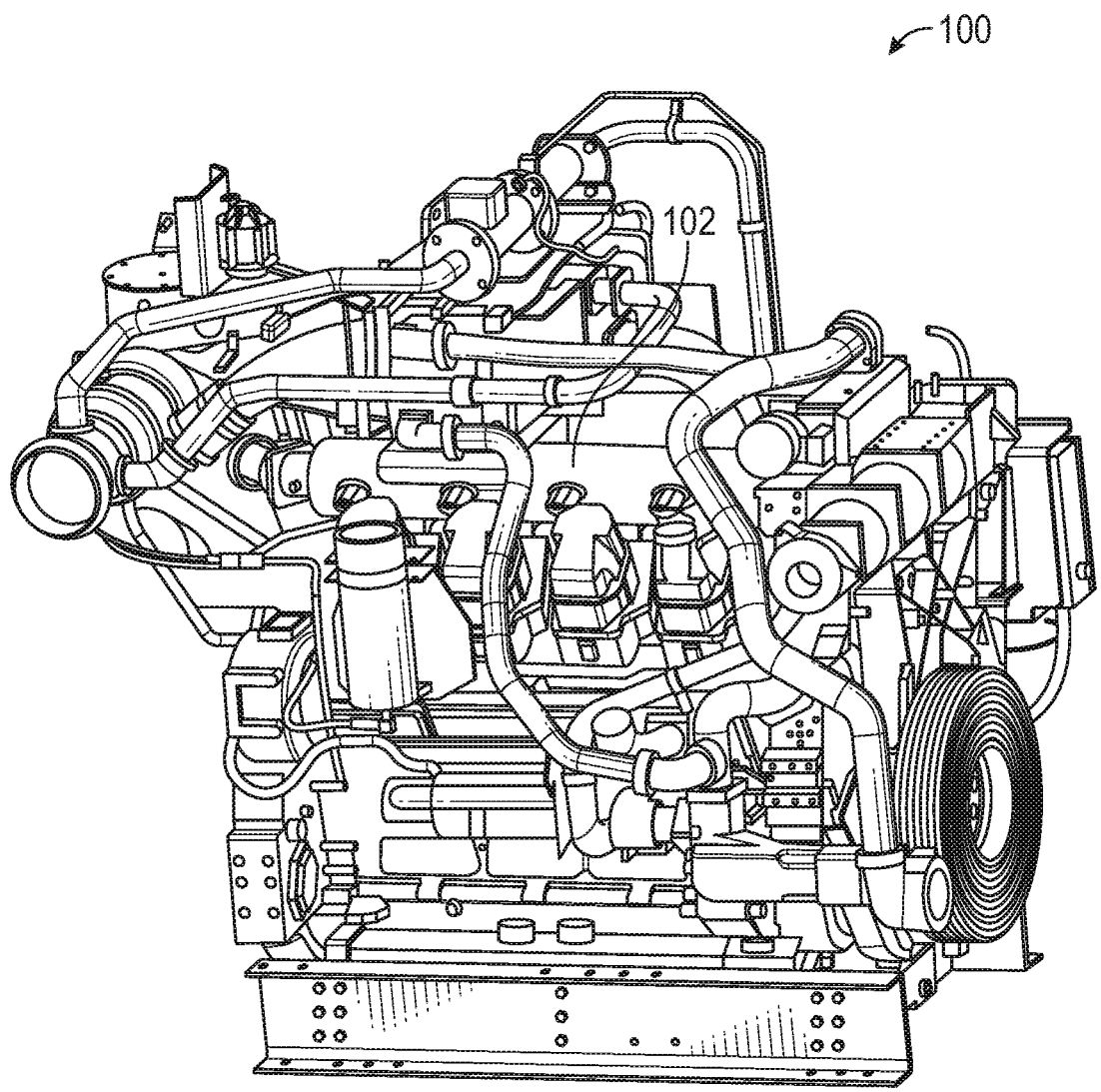
FIG. 1 is a perspective view of an example gas engine.

FIG. 1 is a perspective view of an example gas engine 100 that includes an exhaust manifold assembly 102. The gas engine 100 may be any engine configured to generate electricity using a gaseous fuel, for example, such as an internal combustion engine. Gaseous fuels are fuels that are in a gaseous state under ordinary conditions such as at standard temperature and pressure. Gaseous fuels may include, for example, methane, ethane, liquified natural gas (LNG), propane, blends of these, and the like.

The exhaust manifold assembly 102 may include a water-cooled exhaust manifold to lower surface temperatures of the gas engine 100, for example. In one example, the gas engine 100 may be used in landfill applications and configured to generate electricity using landfill gases. These landfill gases may be produced naturally as organic waste decomposes in the landfill. In some locations, the landfill gas may include a high sulfur ($H_2S$) content, which can result in exhaust gases that include $SO_3$, for example. It is desirable to ensure that the water-cooled surfaces do not lower the temperature of the exhaust such that the $SO_3$ in the exhaust gases can condense into sulfuric acid. While described with reference to landfill gases, other gas sources used by gas engines may also include $H_2S$.

Figure 2:
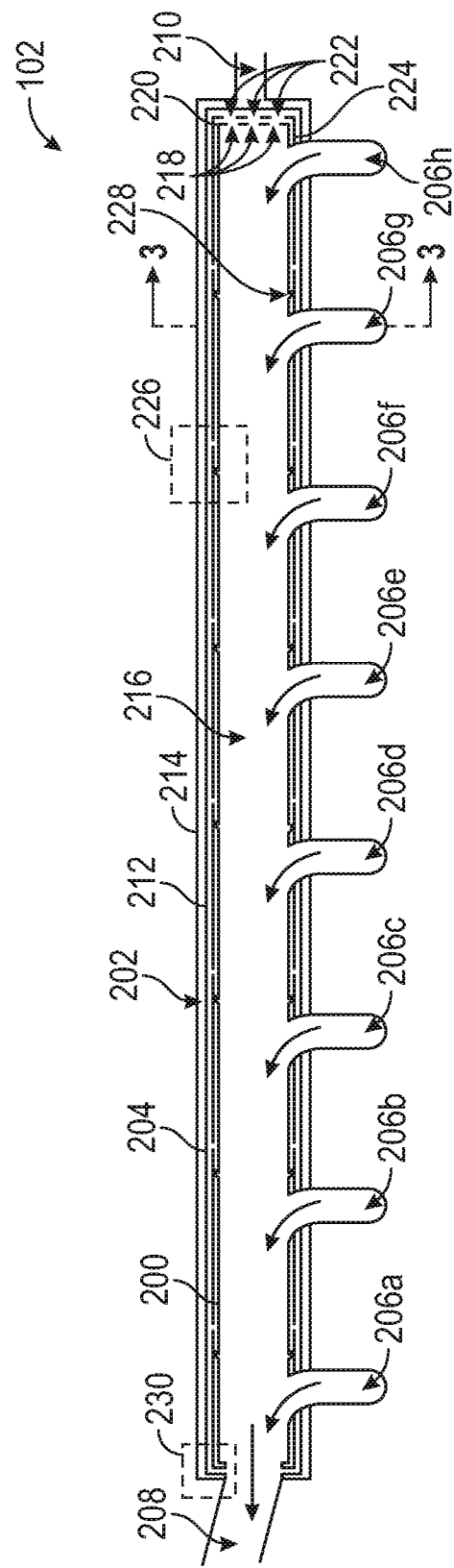
FIG. 2 is a cross-section view illustrating an example exhaust assembly for a gas engine.

FIG. 2 is a cross-section view illustrating an example exhaust manifold assembly 102 for a gas engine. The exhaust manifold assembly 102 includes an exhaust tube 200, a coolant passage 202, an optional radiation shield 204, exhaust inlets 206a-206h, an exhaust outlet 208, and a coolant outlet 210. The coolant passage 202 is formed between an inner shell 212 and an outer shell 214 and is configured to receive a coolant through one or more coolant inlets. The coolant passage 202 may be a water jacket and the coolant may be water or any other liquid or gaseous substance selected to provide cooling for components of the engine. Exhaust gases are received through the exhaust inlets 206a-206h, for example, and flow to the exhaust outlet 208 through a main exhaust passage 216.

The exhaust manifold assembly 102 includes one or more holes 218 in an end 220 of the exhaust tube 200 opposite the exhaust outlet 208, and one or more holes 222 in an end 224 of the radiation shield 204 adjacent the end 220 of the exhaust tube 200. In one example, there may be a single hole 218 in the end 220 and a single hole 222 in the end 224. In other examples, there may be multiple holes 218 in the end 220 and/or multiple holes 222 in the end 224. The holes 218 may be offset from the holes 220 or may be axially aligned, for example.

Due to the coolant flowing through the coolant passage 202, the inner shell 212 of the coolant passage 202 may be at a temperature below that which the exhaust gas can condense into sulfuric acid, for example. Without the holes 218 and 222, stagnant gas may collect near the end 220 of the exhaust tube 200 between the exhaust tube 200 (or radiation shield 204) and the coolant passage 202. Because of the low flow rate of the stagnant gas and the relatively low temperature of the inner shell 212 of the coolant passage 202, the temperature of the gas may fall to a temperature low enough for $SO_3$ within the exhaust gas to condense into sulfuric acid (such as 130° C.), which may lead to corrosion, for example.

Without the holes 218 and 222, the stagnant gas may enter the passages between the exhaust tube 200, the radiation shield 204, and the coolant passage 202 at connection joints of the exhaust tube 200 and the radiation shield 204. These joints can be seen in the zoomed portion 226, illustrated in FIG. 4. The gaps created by these joints may be included by design to accommodate thermal expansion within the exhaust manifold assembly 102, for example. The gas that flows in the passages between the exhaust tube 200 and the coolant passage 202 in front of (toward the outlet 208) the final joint 228 may flow at a great enough velocity to the exhaust outlet 208 that the temperature of the exhaust gas does not drop enough such that the gas can condense into sulfuric acid. Without the holes 218 and 222, the gas behind the final joint 228 (toward the end 220 of the exhaust tube 200) can stagnate, allowing the temperature of the exhaust gas to drop low enough that sulfuric acid can form.

By including the holes 218 in the end 220 of the exhaust tube 200, the exhaust gas can flow between the exhaust tube 200, the radiation shield 204, and the coolant passage 202, around the end 220 to the exhaust outlet 208 through passage exit 230, preventing stagnation of the gas at the end 220 of the exhaust tube 200, and in turn preventing the gas from falling in temperature enough to condense into sulfuric acid. The geometry of the holes 218 and 222, and the passage exit 230 may be selected to ensure the velocity of the exhaust gas in the passage adjacent the inner shell 212 is great enough to keep the $SO_3$ in the gas from condensing.

Figure 3:
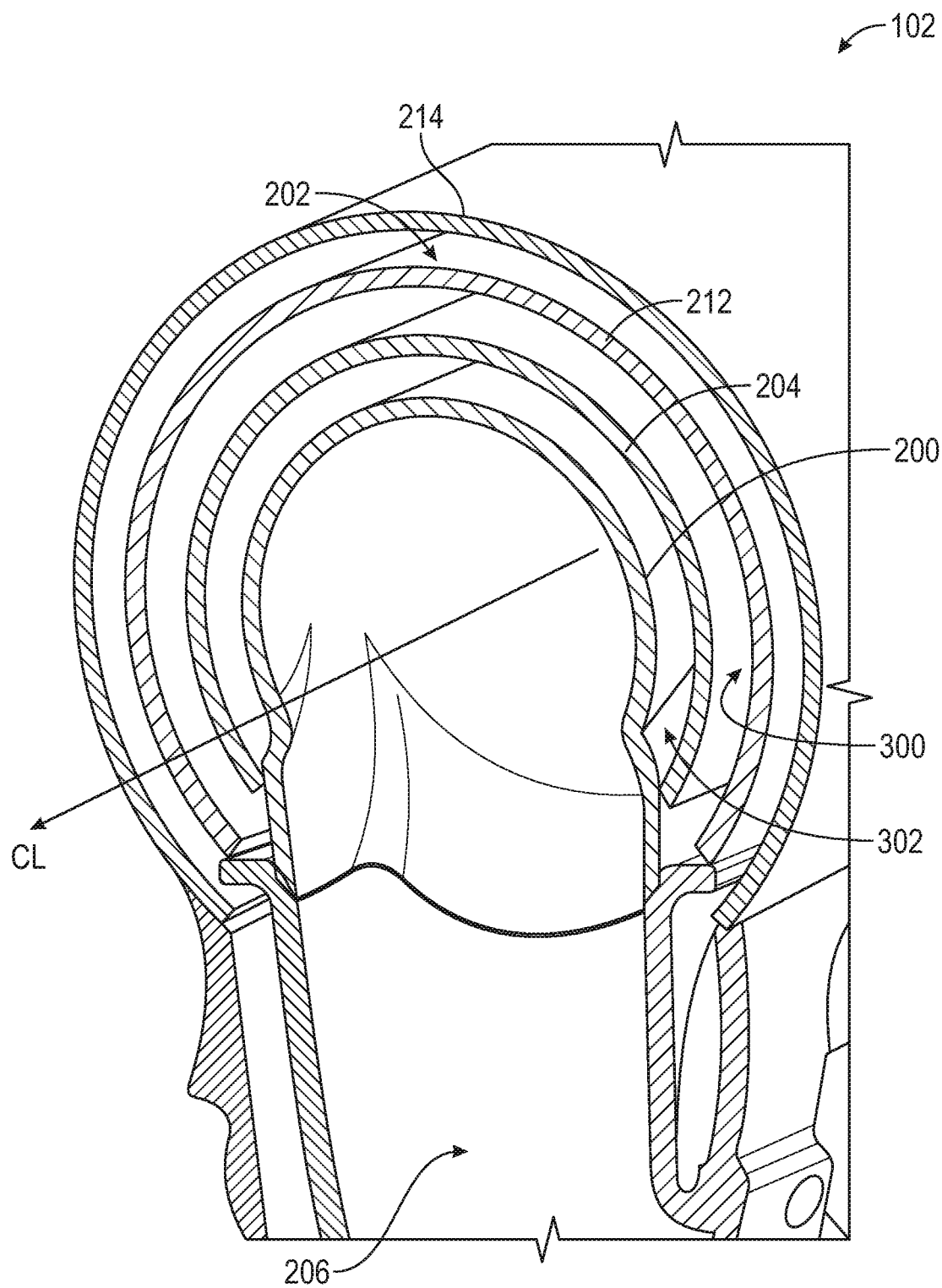
FIG. 3 is a perspective view illustrating a cross-section of an example exhaust assembly for a gas engine.

FIG. 3 is a perspective view illustrating a cross-section of an example exhaust manifold assembly 102 for a gas engine. The cross-section is taken along the line 3-3 illustrated in FIG. 2. As seen in FIG. 3, the exhaust tube 200 is oriented annularly about an axis CL. The optional radiation shield 204 is oriented annularly about the axis CL and radially outward of the exhaust tube 200. The inner shell 212 of the coolant passage 202 is oriented annularly about the axis CL and radially outward of the radiation shield 204 and the outer shell 214 is radially outward of the inner shell 212. The coolant (water, for example) flows through the annular coolant passage 202. Exhaust gases flow through the annular passage 300 between the radiation shield 204 and the inner shell 212, and through the annular passage 302 between the exhaust tube 200 and the radiation shield 204.

Figure 4:
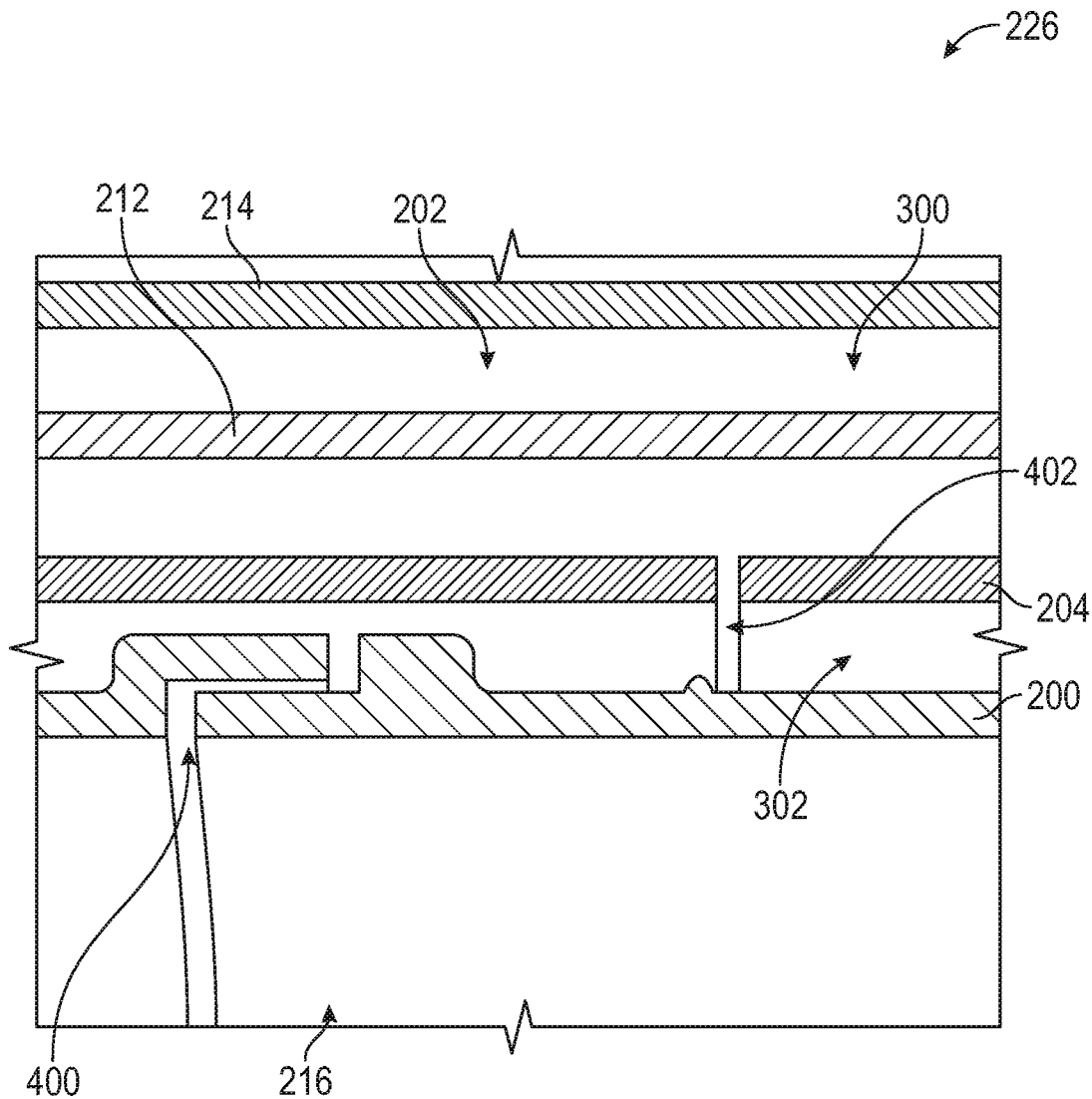
FIG. 4 is a cross-section view illustrating a portion of an example exhaust assembly for a gas engine.

FIG. 4 is a cross-section view illustrating the joint portion 226 of the example exhaust manifold assembly 102 for the gas engine 100. The portion 226 includes a slip joint 400 and a radiation shield gap 402. These gaps may be included in the design of the exhaust manifold assembly 102 intentionally to accommodate thermal expansion of components of the exhaust manifold assembly 102, for example. Some of the exhaust flowing through the main exhaust passage 216 flows through the slip joint 400 and the radiation shield gap 402 into the passages 300 and 302 between the exhaust tube 200, the radiation shield 204, and the inner shell 212 of the coolant passage 202.

The exhaust gases will flow through the passages 300 and 302 generally toward the exhaust outlet 208. For the slip joint 400 furthest from the exhaust outlet 208 (slip join 228 in FIG. 1), the exhaust gas in the passage 300 between the radiation shield 204 and the inner shell 212 of the coolant passage 202 may stagnate. The stagnated gas may sit in contact with the inner shell 212, which is at a lower relative temperature due to the coolant flowing through the coolant passage 202. The low temperature of the inner shell 212 may decrease the temperature of the stagnant gases such that $SO_3$ in the gas may condense into sulfuric acid. By including the holes 218 and 222 (illustrated in FIG. 1), the gases at the end 220 of the exhaust tube 200 do not stagnate, but rather flow generally from the end 200 to the outlet 208.

Figure 5:
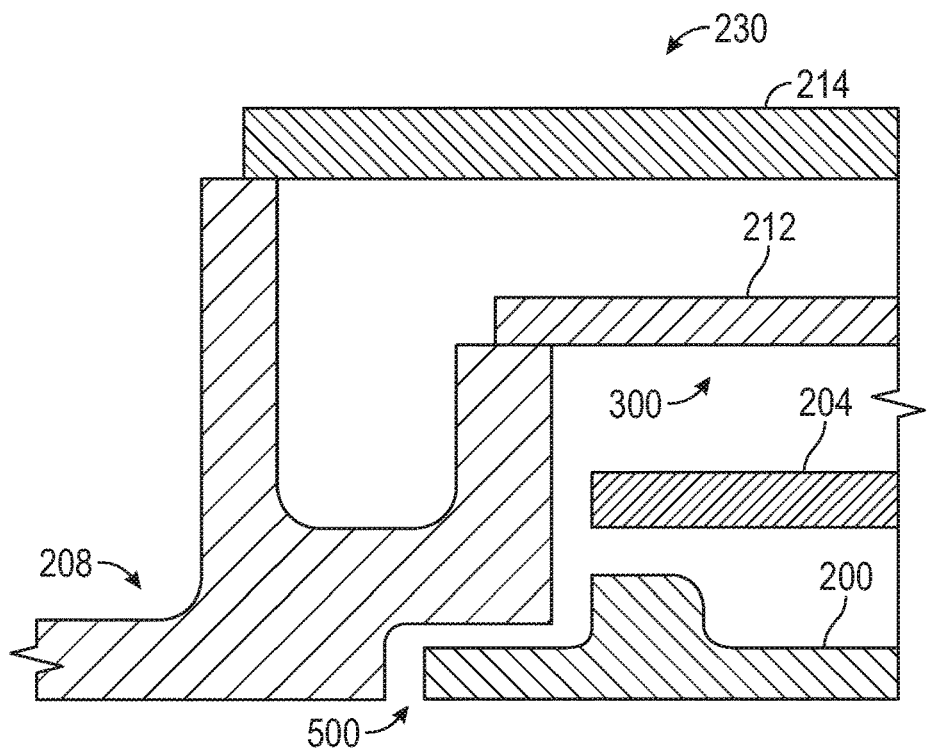
FIG. 5 is a cross-section view illustrating a portion of an example exhaust assembly for a gas engine.

FIG. 5 illustrates an example exit 500 for the exhaust gases flowing in the passages 300 and 302. The exit 500 is a gap in the exhaust tube 200 that allows the exhaust gases to flow out of the passages 300 and 302 to the exhaust outlet 208. The geometry of the exit 500 is a main restrictor for controlling the flow in the passages 300 and 302. The size of the holes 218 and 222, and restriction of the exit 500 will control the actual flow of exhaust gases through the passages 300 and 302. The flow through the passage 302 may tend to be much hotter as the gases in the passage 302 will not be in contact with the coolant passage 202. Thus, the geometry of the gaps in the exhaust tube 200 and the heat shield 204 can also be configured to direct more flow into the passage 300. The size of the exit gap 500 can be any size selected based on the needs of the system to provide a desired flow velocity of the exhaust gases through the passage 300.

Figure 6:
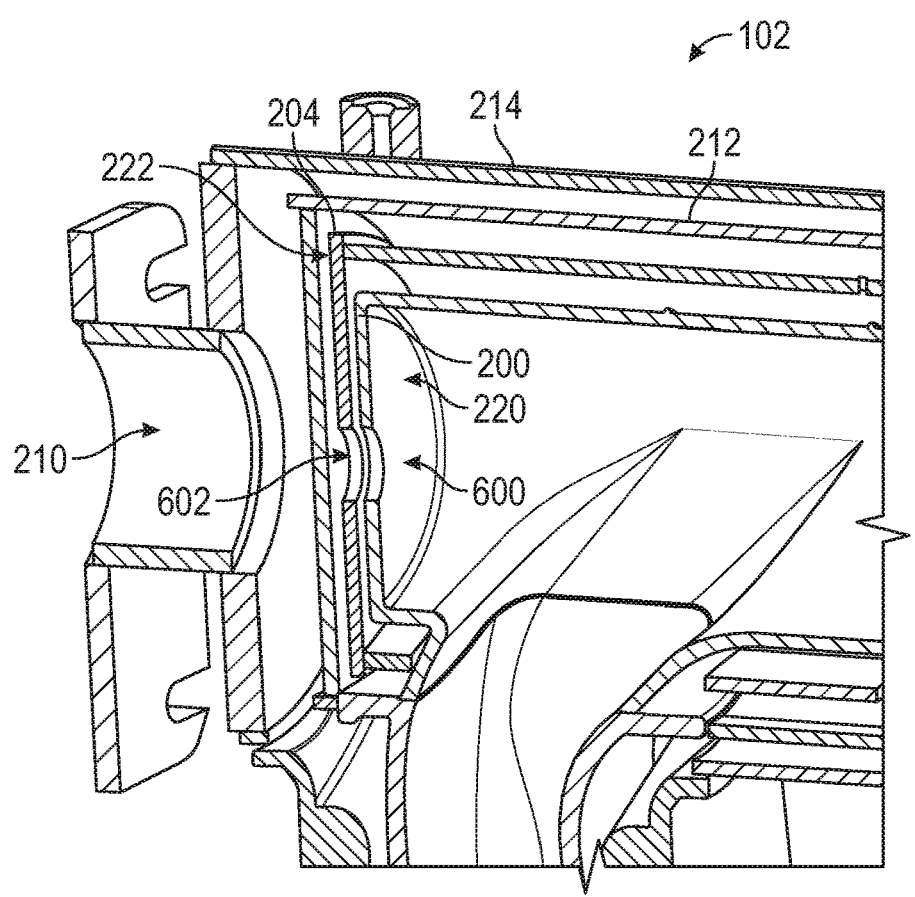
FIG. 6 is a perspective view of an end of an exhaust assembly for a gas engine.

FIG. 6 is a perspective view of an end of an exhaust assembly for a gas engine. In the example illustrated in FIG. 6, the end 220 of the exhaust tube includes a single hole 600 and the end 224 of the radiation shield 204 includes a single hole 602. The holes 600 and 602 are axially aligned. In addition to providing flow around the end of the exhaust tube 200, the holes 600 and 602 may also provide aid alignment during manufacture of the gas engine as the holes 600 and 602 are axially aligned. The size of the holes 600 and 602, in combination with the exit gap 500 control the velocity of the gasses flowing through the passage 300. In one example, the diameter of the holes 600 and 602 may be 30 mm, for example. This size may ensure that the velocity of the gas is high enough that condensation of the $SO_3$ in the exhaust gas does not occur, but low enough that the temperatures within the engine are not adversely affected. In other examples, the size of the holes 600 and 602 can be any other size used to achieve a desired flow velocity of the gases in the passage 300.

INDUSTRIAL APPLICABILITY

In one illustrative example, the engine 100 is a Caterpillar G3500 gas engine used to convert landfill gas into electrical energy. The engine includes a water-cooled exhaust manifold. The manifold includes an exhaust tube defining a main exhaust passage. The exhaust tube includes one or more holes in the end of the tube opposite an exhaust outlet. The exhaust enters the manifold through several exhaust inlets and flows from the inlets to the exhaust outlet. A water jacket is oriented radially outward of the exhaust tube and configured to carry water to provide cooling for exhaust surfaces. The exhaust flows into the passage between the exhaust tube and the water jacket through the hole in the end of the exhaust tube. The exhaust then flows from the hole, through the passage, to the exhaust outlet. This prevents stagnant exhaust gas from collecting at the end of the manifold, and lowering in temperature enough that sulfuric acid can form.

The above detailed description is intended to be illustrative, and not restrictive. The scope of the disclosure should, therefore, be determined with references to the appended claims, along with the full scope of equivalents to which such claims are entitled.

What is claimed is:

1. An exhaust assembly comprising:
   an exhaust tube oriented about an axis, wherein an exhaust gas is configured to flow through the exhaust tube in a direction away from an end wall of the exhaust tube; and
   a coolant passage oriented about the axis radially outward of the exhaust tube, the coolant passage having an inner shell and an outer shell, wherein the inner shell comprises an inner wall axially adjacent the end wall of the exhaust tube;
   wherein the end wall of the exhaust tube comprises one or more holes permitting exhaust gas to flow through the end wall and between an outer side of the end wall of the exhaust tube and the inner wall of the inner shell of the coolant passage around the end wall of the exhaust tube between an outer wall of the exhaust tube and the inner shell of the coolant passage to regulate a temperature of the inner shell of the coolant passage.

2. The exhaust assembly of claim 1, further comprising:
   a radiation shield oriented about the axis, radially outward of the outer wall of the exhaust tube and radially inward of the inner shell of the coolant passage, the radiation shield comprising an end adjacent the end wall of the exhaust tube;
   wherein the end of the radiation shield includes one or more holes to permit the exhaust gas to flow between the radiation shield and the inner shell of the coolant passage to regulate the temperature of the inner shell of the coolant passage.

3. The exhaust assembly of claim 2, wherein the one or more holes in the end of the radiation shield are axially aligned with the one or more holes in the end wall of the exhaust tube.

4. A gas engine comprising the exhaust assembly of claim 1.

5. The exhaust assembly of claim 1, wherein the exhaust tube comprises a plurality of exhaust inlets each positioned in a first axial direction with respect to the end wall of the exhaust tube and between the end wall and an outlet of the exhaust tube opposite the end wall of the exhaust tube, wherein no exhaust gas inlets are positioned in a second axial direction opposite the first axial direction with respect to the end wall of the exhaust tube and wherein the exhaust gas is received through the plurality of exhaust inlets and configured to flow out of the outlet of the exhaust tube.

6. The exhaust assembly of claim 5, wherein the exhaust flowing between the outer wall of the exhaust tube and the coolant passage is configured to exit the passage between the outer wall of the exhaust tube and the inner shell of coolant passage at a gap in the outer wall of the exhaust tube adjacent the outlet of the exhaust tube.

7. The exhaust assembly of claim 1, wherein the coolant passage is a coolant passage configured to receive water as the coolant.

8. A gas engine comprising:
   an exhaust assembly configured to carry an exhaust gas, the exhaust assembly comprising:
   an exhaust tube oriented about an axis, wherein the exhaust gas is configured to flow through the exhaust tube in a direction away from an end wall of the exhaust tube; and
   a coolant passage oriented about the axis radially outward of the exhaust tube, the coolant passage having an inner shell, wherein the inner shell comprises an inner end wall axially adjacent the end wall of the exhaust tube;
   wherein the end wall of the exhaust tube comprises one or more holes permitting exhaust gas to flow through the end wall and between an outer side of the end wall of the exhaust tube and the inner end wall and around the end wall of the exhaust tube between the exhaust tube and the inner shell of the coolant passage to regulate a temperature of the inner shell of the coolant passage.

9. The gas engine of claim 8, wherein the exhaust assembly further comprises:
   a radiation shield oriented about the axis, radially outward of the exhaust tube and radially inward of the inner shell of the coolant passage, the radiation shield comprising an end adjacent the end wall of the exhaust tube;
   wherein the end of the radiation shield includes one or more holes to permit the exhaust gas to flow between the radiation shield and the inner shell of the coolant passage to regulate the temperature of the inner shell of the coolant passage.

10. The gas engine of claim 9, wherein the one or more holes in the end of the radiation shield are axially aligned with the one or more holes in the end wall of the exhaust tube.

11. The gas engine of claim 8, wherein the exhaust tube comprises a plurality of exhaust inlets each positioned in a first axial direction with respect to the end wall of the exhaust tube and between the end wall and an outlet of the exhaust tube opposite the end wall of the exhaust tube, wherein no exhaust gas inlets are positioned in a second axial direction opposite the first axial direction with respect to the end wall of the exhaust tube, and wherein the exhaust gas is received through the plurality of exhaust inlets and configured to flow out of the outlet of the exhaust tube.

12. The gas engine of claim 11, wherein the exhaust flowing between the exhaust tube and the inner shell is configured to exit at a gap in exhaust tube adjacent the outlet of the exhaust tube.

13. The gas engine of claim 8, wherein the coolant passage is configured to receive water as the coolant.

14. A method of preventing condensation of exhaust gases within an exhaust assembly, the method comprising:
   receiving the exhaust gases in an exhaust tube oriented about an axis, the exhaust gases configured to flow through the exhaust tube in a direction away from an end wall of the exhaust tube;
   receiving a coolant in a coolant passage oriented about the axis radially outward of the exhaust tube, the coolant passage having an inner shell, wherein the inner shell comprises an inner end wall axially adjacent the end wall of the exhaust tube; and
   directing a portion of the exhaust gases, using one or more holes in the end wall of the exhaust tube, to flow through the end wall and between an outer side of the end wall of the exhaust tube and the inner end wall and around the end wall of the exhaust tube between an outer wall of the exhaust tube and the inner shell of the coolant passage to regulate a temperature of the inner shell of the coolant passage.

15. The method of claim 14, wherein the exhaust assembly further comprises a radiation shield oriented about the axis, radially outward of the outer wall of the exhaust tube and radially inward of the inner shell of the coolant passage, the radiation shield comprising an end adjacent the end wall of the exhaust tube, and wherein directing the portion of the exhaust gases comprises:

directing the portion of the exhaust gases, using one or more holes in the end of the radiation shied, to flow between the radiation shield and the inner shell of the coolant passage to regulate the temperature of the inner shell of the coolant passage.

16. The method of claim 15, wherein the one or more holes in the end of the radiation shield are axially aligned with the one or more holes in the end wall of the exhaust tube.

17. The metho of c aim 14, wherein the exhaust assembly is included in a gas engine.

18. The method of claim 14, wherein receiving the exhaust gases in the exhaust tube comprises receiving the exhaust gases through a plurality of exhaust inlets each positioned in a first axial direction with respect to the end wall of the exhaust tube and between the end wall and an outlet of the exhaust tube opposite the end wall of the exhaust tube, wherein no exhaust gas inlets are positioned in a second axial direction opposite the first axial direction with respect to the end wall of the exhaust tube wherein the exhaust gas is configured to flow out of the outlet of the exhaust tube.

19. The method of claim 18, further comprising directing the portion of the exhaust gases to exit the passage between the outer wall of the exhaust tube and the inner shell of coolant passage at a gap in the outer wall of the exhaust tube adjacent the outlet of the exhaust tube.

20. The method of claim 14, wherein receiving the coolant in a coolant passage comprises receiving water in the coolant passage.

\* \* \* \* \*